June 25, 1963
A. W. KROGMAN
3,095,370
FILTER
Filed Jan. 21, 1960
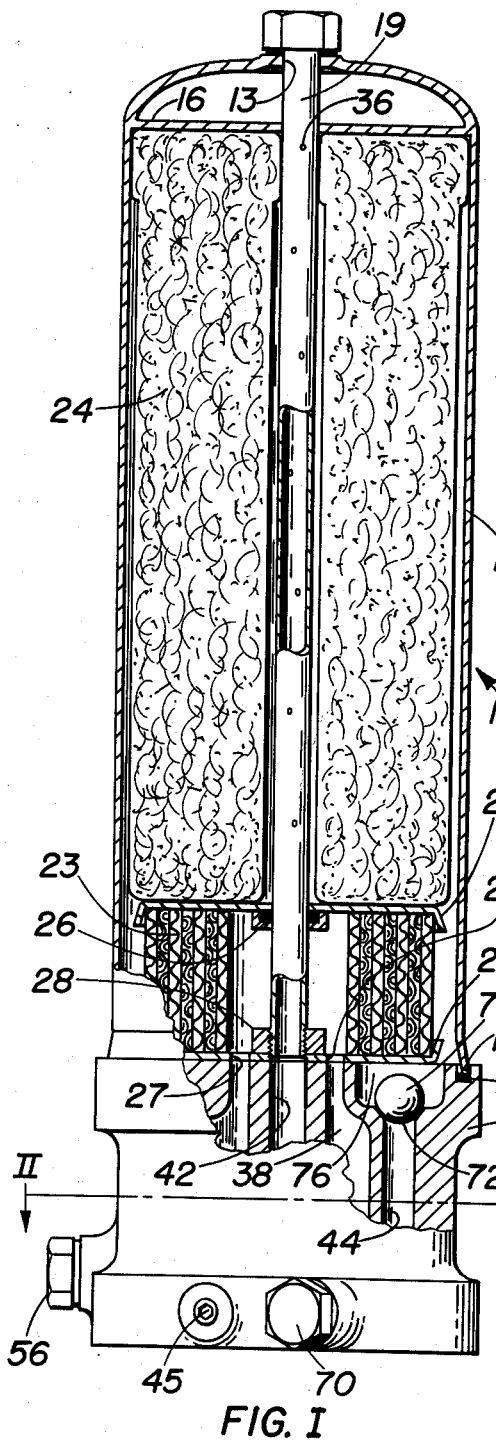
FIG. I
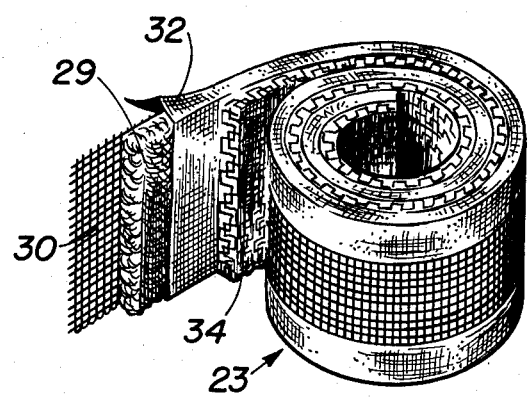
FIG. III
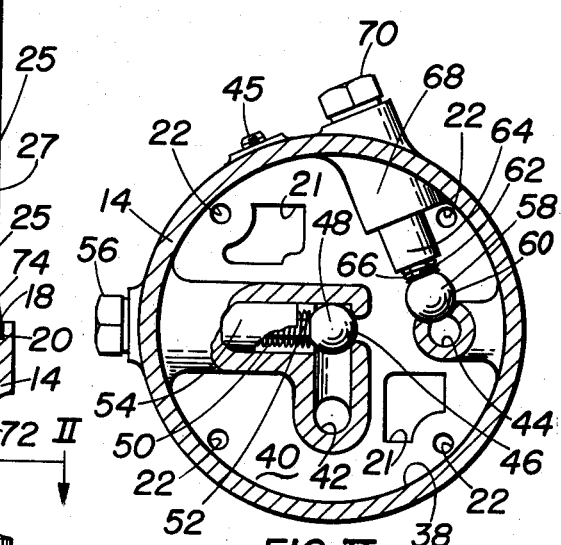
FIG. II
INVENTOR
ALFRED W. KROGMAN
BY *Edward A. Petko*
ATTORNEY

United States Patent Office 3,095,370
Patented June 25, 1963

3,095,370
FILTER
Alfred W. Krogman, 72—74 Oceanport Ave.,
Long Branch, N.J.
Filed Jan. 21, 1960, Ser. No. 3,852
5 Claims. (Cl. 210—133)

This invention relates generally to filters and more particularly to filters employed for the purpose of removing sediment from oil.

While this invention is not limited to any particular application, it will be convenient to consider it in conjunction with the filtration of oil in internal combustion engines.

In recent years it has become somewhat customary to provide in a single filter casing a full-flow and a part-flow filter element, the full-flow filter element providing filtration of the major portion of the oil stream, and the part-flow filter element providing filtration of a minor portion of the oil stream. When such a combined filter is employed in conjunction with an internal combustion engine, it is important, as it is with other filters, that an ample supply of oil is at all times delivered to the engine bearings, and that clogging of the filter elements will not prevent a sufficient supply of oil from reaching such bearings. It is equally important that the filter does not interfere with or otherwise impede or retard the flow of oil to the engine bearings during the period that the engine is being warmed up. This latter consideration is particularly important when one considers the action of cold weather upon the oil, and the usual delay which accompanies the establishment of full operating oil pressure just after an engine is first started.

In order to insure an adequate flow of oil to the engine bearings under all operating conditions, prior art oil filters have been generally of the by-pass type, wherein the oil dilevered from the sump or engine crankcase is caused to by-pass the filter elements during the period that the elements may be clogged by dirt or the action of cold weather upon the oil. Naturally, during these conditions of engine operation, when the filter elements are by-passed, unfiltered oil is delivered directly to the engine bearings. Consequently, a substantial amount of the normal wear to engine bearings may occur while the bearings are being lubricated by unfiltered oil during the period that the engine is being warmed up.

According to one feature of the present invention a by-pass valve is provided to operate in conjunction with a filter casing containing a part-flow and full-flow filter element to cause the unfiltered oil to by-pass same. This valve is, however, intended to operate only upon rare occasion, and then usually only when the filter elements become thoroughly clogged with dirt. Although this by-pass valve may operate momentarily during cold weather when the engine is first started, its operation here is reduced to a minimum by the provision of additional valve means which aid in the establishment of full oil pressure and in the rapid delivery of filtered oil to the engine bearings. The wear to engine bearings during the period of engine warm up is thus materially reduced.

According to another feature of the present invention the filtered oil is delivered to a distribution chamber from where it may be distributed to the engine bearings as well as to other engine accessories which may require filtered oil.

Still another feature of the present invention is the provision of valve means in the distribution chamber which are operated in response to the oil pressures established therein, and which are adapted to divert a portion of the filtered oil directly to the sump or engine crankcase.

In the preferred embodiment of the present invention an improved full-flow filter element is utilized, and it is of such construction as to provide efficient filtration of the oil while permitting a large quantity of flow.

The important object of this invention therefore is the provision of a new type of filter. These and other objects, features and advantages will become apparent in the following description of the preferred embodiment of the invention taken in connection with the accompanying drawing wherein:

FIG. I is an elevation of the present filter shown partially in section;

FIG. II is a section taken on the line II—II of FIG. I; and

FIG. III is a fragmentary view of the full-flow filter element of the present invention.

Referring now to the drawing, there is shown in FIG. I a generally cylindrical filter casing 10, having a cover portion 12 and a base portion 14. Cover portion 12 is generally cup shaped and is provided with a centrally disposed aperture 13 at its closed end. A retaining member 16 is located within the cover portion 12 adjacent to its closed end, and is provided with a suitable aperture disposed coaxially of the aperture 13. The open end of cover portion 12 is disposed within a coaxial recess 18 provided at one end of the base portion 14. The recess 18 has a suitable gasketing material 20 disposed therein. Cover portion 12 is rigidly secured to base portion 14 by means, such as through bolt 19, to form a unitary leakproof structure adapted for receiving oil to be filtered, as will be described. The opposite end of base portion 14 is provided with plural openings 21 which are adapted to communicate with the engine bearings, and with plural threaded openings 22 which are adapted to receive bolts or other threaded fasteners for securely mounting the casing 10.

There is disposed within the cover portion 12 a lower or full-flow filter element 23, to be hereinafter more fully described, and an upper or part-flow filter element 24 of suitable design. The filter elements 23, 24 are of generally tubular form, are coaxially disposed, and have an outer diameter which is slightly less than the inner diameter of the cover portion 12 so as to provide a space of suitable proportions within the casing 12 for the circulation of unfiltered oil. Flter element 23 is mounted between a pair of similar parallel disposed, centrally apertured retaining plates 25, 25. The end portions of plates 25, 25 are turned inwardly so as to securely retain the element 23 in a desired position, and at the same time prevent the flow of oil therearound. The upper plate 25 is provided with a gasket 26 suitably secured thereto coaxially of the central aperture therein. The lower plate 25 is provided with plural outlet openings 27 disposed coaxially of the central aperture therein.

To assemble the filter thus far described, the lower plate 25 is first located by its central aperture on the upper surface of the base portion 14. The central aperture of the lower plate is adapted to receive an extending portion 28 of a passageway 42, to be described, provided in the base portion 14. Filter element 24 is then placed on the upper plate 25 and the cover portion 12 is then placed over the filter element stack thus formed, with its lower edge portion disposed in the recess 18. Through bolt 19 is next inserted into the cover portion 12 through the aperture 13 and passed downwardly through the filter elements and retaining plates to make threaded engagement with the inner bore of the extending portion 28. Bolt 19 is then tightened until the cover portion 12 makes firm engagement with the gasket 20. It will be apparent that this arrangement of filter elements and casing structure provides a rigid structure, the filter elements and retaining plates being firmly sandwiched between the retaining plate 16 and the upper portion of the base portion 14.

In the full-flow filter element of the present invention there is used a layer of istle designated 29 which is placed upon a backing material 30, which may be a wire screen, or some desired supporting material. Above the istle, a layer of cheese cloth or other suitable cotton gauze 32 is provided. The cheese cloth is wider than the istle or the backing material and, as is shown in FIG. III, it is wound about the istle and the backing material to hold the istle in place upon the backing material. Upon the cheese cloth there is placed a layer of woven wire 34 which has a springy nature, and which will provide a space between the layers of istle and cheese cloth.

The layers of material thus far described are then wound in a cylinder, the number of layers of which depend upon many factors, such as the size of the desired filter element, the capacity of the lubrication system with which the filter element will be used etc. The completed cylinder may then be held together by suitable means, such as metal staples, not shown. The filtering characteristics of the istle and its ability not to absorb moisture that may be present in the oil, together with the arrangement of the closely woven fibers of the cotton gauze provides an effective filter which will admirably remove all but the very smallest particles to be found in the oil and yet hold up admirably for several hundred hours of continuous use.

The normal passage of oil through the filter casing is upwardly within the cover portion 12 through the space allowed intermediate the filter elements and the cover portion. The major portion of the oil stream passes inwardly of the filter element 23 and then outwardly of the cover portion 12 through the openings 27 in the lower plate 25. A minor portion of the oil stream passes inwardly of the element 24. The oil passing inwardly of the element 24 is directed to a central bore of the bolt 19 and downwardly therethrough to the central aperture of the lower retaining plate 25. The central bore of the bolt 19 communicates with the filter element 24 by means of plural openings 36 provided in the periphery thereof.

The base portion 14 most satisfactorily comprises a generally cylindrical casting to provide a distribution chamber 38 within its hollow interior. An end wall 40, having therein the openings 21, 22, closes one end of the base 14. The other end of the base portion is adapted to engage one surface of the lower retaining plate 25, and this end is closed by the cover portion 12. Within the distribution chamber 38, and suitably integrated with the side wall portions thereof, there is provided a pair of oil passageways 42 and 44.

The upper end of distribution chamber 38 terminates in suitable apertures which are adapted to receive the filtered oil which flows outwardly of outlet openings 27. The filtered oil entering chamber 38 then passes outwardly thereof through openings 21 directly to the engine bearings, or through one or more openings, only one shown plugged by a threaded screw 45, provided in the side walls of the base portion 14.

Passageway 42 has an upper end which terminates in internally threaded portion 28, heretofore described, to communicate with the interior of through bolt 19. The lower end of passageway 42 is adapted to be connected to suitable conduit means, not shown, which lead directly to the sump or engine crankcase. Thus, the finely filtered oil is delivered directly to the sump or engine crankcase after filtration by the part-flow filter element.

The passageway 44 has an upper end disposed to deliver unfiltered oil from the sump or engine crankcase directly into the cover portion 12 in the space provided between the filter elements and the casing. The lower end of passageway 44 is adapted to be connected to means such as an oil pump, not shown, delivering dirty unfiltered oil from the sump or engine crankcase to the filter casing.

Intermediate its ends, passageway 42 is provided with a suitable aperture which defines a valve seat 46, and which provides a passageway to establish communication between the passageway 42 and the distribution chamber 38. A ball valve 48 is biased into engagement with the seat 46 by a suitable spring 50. The ball valve 48 has an elongated cylindrical stem 52 extending inwardly of a cylindrical bore provided in a retaining member 54. The member 54 is disposed in a suitable opening provided in the passageway 42 and terminates in a suitable bolt head 56 extending outwardly of the base portion 14. Although it is not shown, the retaining member 54 makes threaded engagement with a suitable opening provided in the side wall of base portion 14 which establishes communication with the passageway 42. In order to assemble this valve means, the spring 50 is first disposed about the stem 52, the stem and the spring being then disposed in the bore of retaining member 54. The retaining member is then inserted into the passageway 42 and securely threaded into the aperture provided in the base portion 14 to form an oil tight joint.

Valve 48 normally engages the seat 46 to prevent the flow of oil from the distribution chamber 38 into the passageway 42. However, when the oil pressure within the chamber 38 exceeds permissive limits, as determined by the spring characteristics of the spring 50, the valve 48 is opened and the oil from the distribution chamber is returned directly to the sump or crankcase via the passageway 42. The pressure at which valve 48 will be moved from the seat 46 is determined by the pressure of the oil that would otherwise cause leaks to occur in the filter casing, engine accessories or engine bearings. Operation of valve 48 may be expected to occur frequently upon operation of the valve 58, as hereinafter described.

A valve means, similar to the valve means acting in conjunction with the passageway 42, is provided to act in conjunction with the passageway 44. This valve means however, functions to permit the flow of oil from the passageway into the distribution chamber, rather than to permit the flow of oil from the distribution chamber into the passageway, and is shown comprising a ball valve 58 disposed to co-operate with a valve seat 60 formed in a suitable aperture formed in the side wall of passageway 44. Valve 58 is provided with a stem 62 disposed in a cylindrical bore of a retaining member 64. A spring 66 surrounds the stem 62 and biases the ball valve 58 into engagement with the seat 60. Retaining member 64 is disposed outwardly of the chamber 38 through a suitable internally threaded enlarged portion 68 formed on the side wall of base portion 14. Retaining member 64 terminates in a bolt head 70 and is adapted to make threaded engagement with the bore in enlarged portion 68 to form an oil tight seal.

Valve 58 is biased into engagement with the seat 60 to prevent the flow of inlet oil into chamber 38. However, if for any reason the filter elements should become clogged, preventing the flow of oil to the engine bearings, the oil pressure within inlet passageway 44 will unseat ball valve 58 to admit this unfiltered oil into the chamber 38, from where it can be distributed to the engine bearings. Accordingly, the flow of oil within the inlet passageway will by-pass the casing portion 12 and the filter elements during the time that the valve is operated. Should an excessive pressure build up in chamber 38, the valve 48 will operate and oil will pass directly from the chamber to the sump via the passageway 42.

An additional valve seat 72 is formed at the upper end of inlet passageway 44. Valve seat 72 is adapted to receive a ball valve 74 to control the flow of oil through the inlet passageway. The valve 74 is disposed in a recess 76 which is formed in the vicinity of the valve seat 72 and which is retained therein by the bottom plate 25. In operation, the valve 74 is forced off its seat upon occurrence of an upward flow of oil through the passageway 44. When the oil is flowing normally in its upward direction through the passageway 44, the valve does not impede or in any way retard the flow of oil for it is forced upwardly against the bottom plate 25 by the action of the oil. However, when the oil begins to flow downwardly through the passageway 44, the valve 72 is returned by gravity into engagement with the seat 74 to prevent the downward passage of the oil. Not only is the valve effective in preventing the oil in the cover portion 12 from returning to the sump but, a vacuum is created within the inlet passageway 44 by the downward flow of oil therein to prevent this oil from returning to the sump. Therefore, the oil remains in the passageway 44 until the next use of the circulating pump. The fact that the oil remains in the passageway does not necessitate that oil be moved from the sump to the cover portion 12 before the filtration of the oil can begin aids materially in the rapid establishment of full operating oil pressure.

Under normal conditions, through the use of the full-flow and the part-flow filter elements in a single casing, all oil supplied to the engine bearings will be filtered by the full-flow filter element so that all but the very finest of the dirt particles are removed. A small portion of the oil will be subjected to a more thorough cleaning by the part-flow filter element to be returned to the engine sump. Accordingly, the usual dirt in the oil is prevented from reaching the engine bearings, and the fine filtering of the oil stream also keeps the oil free of sludge gasoline, carbon and the like.

While only one embodiment of the present invention has been shown and described, it is to be understood that it is for the purpose of illustration only and that various changes may be made therein without departing from the spirit of the invention as defined by the appended claims.

I claim:

1. A filter for removing sediment from oil delivered thereto under pressure from a sump, comprising in combination, a base member having a generally hollow interior forming a distribution chamber and including an inlet opening and an outlet opening adapted to be connected to an oil lubricated device, a filter casing connected to said base, a vertically disposed inlet conduit passing through said distribution chamber and including an enlarged end portion having a valve seat therein for delivering oil to said casing from the sump, an outlet conduit extending through said distribution chamber for delivering oil from said casing to the sump, a full-flow element and a part-flow element of cylindrical form, each having a central bore and being axially aligned within said casing, each of said elements having an outer periphery spaced from said casing to permit the flow of inlet oil into said casing and therefrom radially through said filter elements to their said central bores, said central bore of said full-flow element being disposed adjacent the inlet opening of said distribution chamber to permit flow of oil from said full flow element directly to said distribution chamber, an imperforate tube extending from said base into said casing through the central bores of said filter elements and having a perforate portion communicating with said part-flow element to permit flow of oil from said part-flow element to said outlet conduit, first pressure operated valve means disposed within said distribution chamber for by-passing oil from said inlet conduit directly to said distribution chamber, second pressure operated valve means disposed within said distribution chamber for by-passing oil from said distribution chamber directly to said outlet conduit, a retaining member disposed within said filter casing partially closing the enlarged end portion of said vertically disposed inlet conduit and defining a confined chamber therein, and an unbiased ball disposed within said confined chamber and moveable therein in response to the flow of oil through said inlet conduit, said ball engaging said valve seat to prevent oil from flowing outwardly of said filter casing upon a reduction in the pressure of the oil flowing through said inlet conduit.

2. A filter according to claim 1 wherein said filter casing is generally cylindrical in form and vertically disposed, and the part-flow element is disposed atop the full-flow element.

3. A filter according to claim 2 wherein said tube has one threaded end adapted to be received by one end of said outlet conduit and has another end extending outwardly of said filter casing and cooperating with the outer surface thereof for securing said casing to said base member.

4. A filter for removing sediment from oil delivered thereto under pressure from a sump, comprising in combination, a base member having a generally hollow interior forming a distribution chamber and including an inlet opening and an outlet opening adapted to be connected to an oil lubricated device, a generally cylindrical and vertically disposed filter casing adapted to be connected to said base, a vertically disposed inlet conduit passing through said distribution chamber and including an enlarged end portion having a valve seat therein for delivering oil to said casing from the sump, an outlet conduit including a threaded end portion extending through said distribution chamber for delivering oil from said casing to the sump, a circular plate disposed within said casing partially closing the enlarged end portion of said vertically disposed inlet conduit and defining a confined chamber therein, said plate having a central aperture disposed coaxially of said outlet conduit and having plural apertures disposed coaxially of said central aperture and communicating with said outlet opening, a full-flow element and part-flow element, each having a central bore and being axially aligned within said casing with said full-flow element disposed upon said plate and having its central bore disposed coaxially of the plural apertures in said plate, an imperforate plate disposed between said full-flow and part-flow elements and having a central aperture axially aligned with the central aperture of the other said plate, each of said filter elements having an outer periphery spaced from the inner wall of said casing to permit flow of oil from said inlet conduit to said casing and therefrom radially through said filter elements to their central bores, an imperforate tube extending through the central bores of said filter elements and through the central apertures of said plates, said tube having an end which threadedly engages the threaded end of said outlet conduit and another end extending outwardly of said filter casing and cooperating with the outer surface thereof for securing said casing to said base member and said filter elements and said plates within said casing, said tube having a perforate portion communicating with said central bore of said part-flow element to permit flow of oil therefrom to the sump, first pressure operated valve means disposed within said distribution chamber for by-passing oil from said inlet conduit directly to said distribution chamber, second pressure operated valve means disposed within said distribution chamber for by-passing oil from said distribution chamber directly to said outlet conduit, and an unbiased ball disposed within said confined chamber in said inlet conduit and moveable therein in response to the flow of oil there through, said ball seating upon said valve seat to prevent flow of oil outwardly of said filter casing upon a reduction in the pressure of the oil flowing through said inlet conduit.

5. A filter according to claim 4 wherein said plates each have a turned over lip portion which engage the outer periphery of said full-flow element and serve to align said full-flow element within said casing.

References Cited in the file of this patent

UNITED STATES PATENTS

| 1,901,484 | Winslow | Mar. 14, 1933 |
| 2,098,725 | Hurn | Nov. 9, 1937 |
| 2,108,798 | Dalrymple | Feb. 22, 1938 |
| 2,253,685 | Burckhalter | Aug. 26, 1941 |

FOREIGN PATENTS

| 751,892 | Great Britain | July 4, 1956 |